United States Patent
Lee et al.

(10) Patent No.: US 10,231,282 B1
(45) Date of Patent: Mar. 12, 2019

(54) TECHNIQUES AND APPARATUSES FOR TUNE-AWAY MANAGEMENT

(71) Applicant: QUALCOMM Incorporated, San Diego, CA (US)

(72) Inventors: Kuo-Chun Lee, San Diego, CA (US); Qingxin Chen, San Diego, CA (US); Min Wang, San Diego, CA (US); Chih-Ping Hsu, San Diego, CA (US); Omar Sabbarini, San Diego, CA (US)

(73) Assignee: QUALCOMM, Incorporated, San Diego, CA (US)

( * ) Notice: Subject to any disclaimer, the term of this patent is extended or adjusted under 35 U.S.C. 154(b) by 0 days.

(21) Appl. No.: 15/703,431

(22) Filed: Sep. 13, 2017

(51) Int. Cl.
| H04W 76/28 | (2018.01) |
| H04W 36/38 | (2009.01) |
| H04W 72/04 | (2009.01) |
| H04W 36/24 | (2009.01) |
| H04W 74/08 | (2009.01) |

(52) U.S. Cl.
CPC ........... *H04W 76/28* (2018.02); *H04W 36/38* (2013.01); *H04W 72/0446* (2013.01); *H04W 36/24* (2013.01); *H04W 74/0816* (2013.01)

(58) Field of Classification Search
CPC ... H04W 76/28; H04W 76/048; H04W 36/38; H04W 36/24; H04W 74/0816
USPC ........................................................ 455/450
See application file for complete search history.

(56) References Cited

U.S. PATENT DOCUMENTS

| 2013/0201850 A1* | 8/2013 | Swaminathan ... H04W 72/1215 370/252 |
| 2014/0293961 A1* | 10/2014 | Khay-Ibbat ............. H04L 49/15 370/331 |
| 2016/0095033 A1* | 3/2016 | Kadiri ..................... H04L 47/32 370/331 |
| 2016/0204908 A1* | 7/2016 | Rafique ................... H04L 1/203 370/252 |
| 2016/0219585 A1 | 7/2016 | Khay-Ibbat et al. |
| 2016/0330653 A1 | 11/2016 | Yang et al. |
| 2017/0086100 A1 | 3/2017 | Sagar |
| 2017/0094568 A1* | 3/2017 | Yang ..................... H04W 36/14 |

FOREIGN PATENT DOCUMENTS

WO    WO-2017055091 A1    4/2017

OTHER PUBLICATIONS

Nokia: "Voice over LTE (VoLTE) Optimization", Nokia Networks, 2015, 20 Pages.

* cited by examiner

*Primary Examiner* — William Nealon
(74) *Attorney, Agent, or Firm* — Qualcomm Incorporated

(57) ABSTRACT

Certain aspects of the present disclosure generally relate to wireless communication. In some aspects, a user equipment may determine a predicted tune-away for a set of voice frames. In some aspects, the user equipment may alter a vocoder rate from a first vocoder rate to a second vocoder rate that is less than the first vocoder rate based at least in part on determining the predicted tune-away for the set of voice frames. In some aspects, the user equipment may drop, in connection with an occurrence of the predicted tune-away, a subset of packets for a time period corresponding to the predicted tune-away. Numerous other aspects are provided.

30 Claims, 11 Drawing Sheets

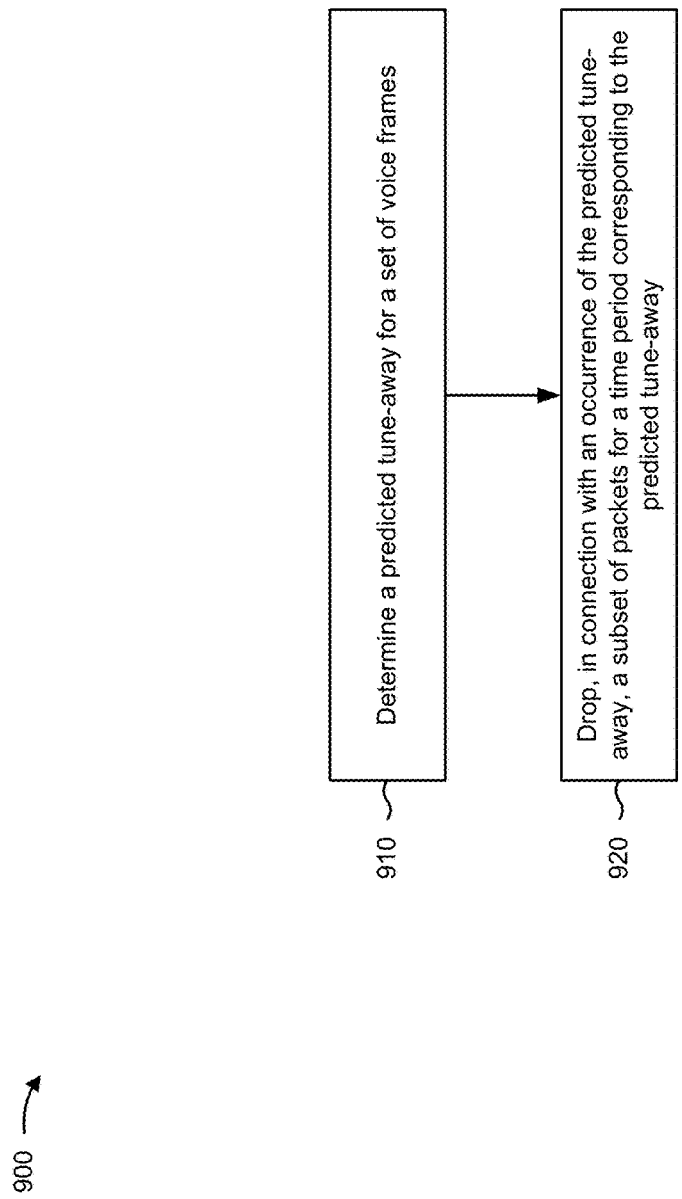

TECHNIQUES AND APPARATUSES FOR TUNE-AWAY MANAGEMENT

FIELD OF THE DISCLOSURE

Aspects of the present disclosure generally relate to wireless communication, and more particularly to techniques and apparatuses for tune-away management.

BACKGROUND

Wireless communication systems are widely deployed to provide various telecommunication services, such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency divisional multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, a national, a regional, and even a global level. An example of a telecommunication standard is Long Term Evolution (LTE). LTE is a set of enhancements to the Universal Mobile Telecommunications System (UMTS) mobile standard promulgated by Third Generation Partnership Project (3GPP). LTE is designed to better support mobile broadband Internet access by improving spectral efficiency, lowering costs, improving services, using new spectrum, and integrating with other open standards using OFDMA on the downlink (DL), SC-FDMA on the uplink (UL), and multiple-input multiple-output (MIMO) antenna technology.

SUMMARY

In some aspects, a method for wireless communication may include determining, by a user equipment, a predicted tune-away for a set of voice frames. The method may include altering, by the user equipment, a vocoder rate from a first vocoder rate to a second vocoder rate that is less than the first vocoder rate based at least in part on determining the predicted tune-away for the set of voice frames.

In some aspects, a user equipment for wireless communication may include memory and one or more processors operatively coupled to the memory. The memory and the one or more processors may be configured to determine a predicted tune-away for a set of voice frames. The memory and the one or more processors may be configured to alter a vocoder rate from a first vocoder rate to a second vocoder rate that is less than the first vocoder rate based at least in part on determining the predicted tune-away for the set of voice frames.

In some aspects, a non-transitory computer-readable medium may store one or more instructions for wireless communication. The one or more instructions, when executed by one or more processors of a user equipment, may cause the one or more processors to determine a predicted tune-away for a set of voice frames. The one or more instructions, when executed by the one or more processors, may cause the one or more processors to alter a vocoder rate from a first vocoder rate to a second vocoder rate that is less than the first vocoder rate based at least in part on determining the predicted tune-away for the set of voice frames.

In some aspects, an apparatus for wireless communication may include means for determining a predicted tune-away for a set of voice frames. The apparatus may include means for altering a vocoder rate from a first vocoder rate to a second vocoder rate that is less than the first vocoder rate based at least in part on determining the predicted tune-away for the set of voice frames.

In some aspects, a method for wireless communication may include determining, by a user equipment, a predicted tune-away for a set of voice frames. The method may include dropping, by the user equipment and in connection with an occurrence of the predicted tune-away, a subset of packets for a time period corresponding to the predicted tune-away.

In some aspects, a user equipment for wireless communication may include memory and one or more processors operatively coupled to the memory. The memory and the one or more processors may be configured to determine a predicted tune-away for a set of voice frames. The memory and the one or more processors may be configured to drop, in connection with an occurrence of the predicted tune-away, a subset of packets for a time period corresponding to the predicted tune-away.

In some aspects, a non-transitory computer-readable medium may store one or more instructions for wireless communication. The one or more instructions, when executed by one or more processors of a user equipment, may cause the one or more processors to determine a predicted tune-away for a set of voice frames. The one or more instructions, when executed by the one or more processors, may cause the one or more processors to drop, in connection with an occurrence of the predicted tune-away, a subset of packets for a time period corresponding to the predicted tune-away.

In some aspects, an apparatus for wireless communication may include means for determining a predicted tune-away for a set of voice frames. The apparatus may include means for dropping, in connection with an occurrence of the predicted tune-away, a subset of packets for a time period corresponding to the predicted tune-away.

Aspects generally include a method, apparatus, system, computer program product, non-transitory computer-readable medium, user equipment, wireless communication device, base station, and processing system as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIG. 9 is a diagram illustrating an example process performed, for example, by a user equipment, in accordance with various aspects of the present disclosure.

DETAILED DESCRIPTION

The detailed description set forth below, in connection with the appended drawings, is intended as a description of various configurations and is not intended to represent the only configurations in which the concepts described herein may be practiced. The detailed description includes specific details for providing a thorough understanding of the various concepts. However, it will be apparent to those skilled in the art that these concepts may be practiced without these specific details.

The techniques described herein may be used for one or more of various wireless communication networks such as code division multiple access (CDMA) networks, time division multiple access (TDMA) networks, frequency division multiple access (FDMA) networks, orthogonal FDMA (OFDMA) networks, single carrier FDMA (SC-FDMA) networks, or other types of networks. A CDMA network may implement a radio access technology (RAT) such as universal terrestrial radio access (UTRA), CDMA2000, and/or or the like. UTRA may include wideband CDMA (WCDMA) and/or other variants of CDMA. CDMA2000 may include Interim Standard (IS)-2000, IS-95 and IS-856 standards. IS-2000 may also be referred to as 1× radio transmission technology (1×RTT), CDMA2000 1×, and/or the like. A TDMA network may implement a RAT such as global system for mobile communications (GSM), enhanced data rates for GSM evolution (EDGE), or GSM/EDGE radio access network (GERAN). An OFDMA network may implement a RAT such as evolved UTRA (E-UTRA), ultra mobile broadband (UMB), Institute of Electrical and Electronics Engineers (IEEE) 802.11 (Wi-Fi), IEEE 802.16 (WiMAX), IEEE 802.20, Flash-OFDM, and/or the like. UTRA and E-UTRA may be part of the universal mobile telecommunication system (UMTS). 3GPP long-term evolution (LTE) and LTE-Advanced (LTE-A) are example releases of UMTS that use E-UTRA, which employs OFDMA on the downlink and SC-FDMA on the uplink. UTRA, E-UTRA, UMTS, LTE, LTE-A and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the wireless networks and RATs mentioned above as well as other wireless networks and RATs.

Figure 1:
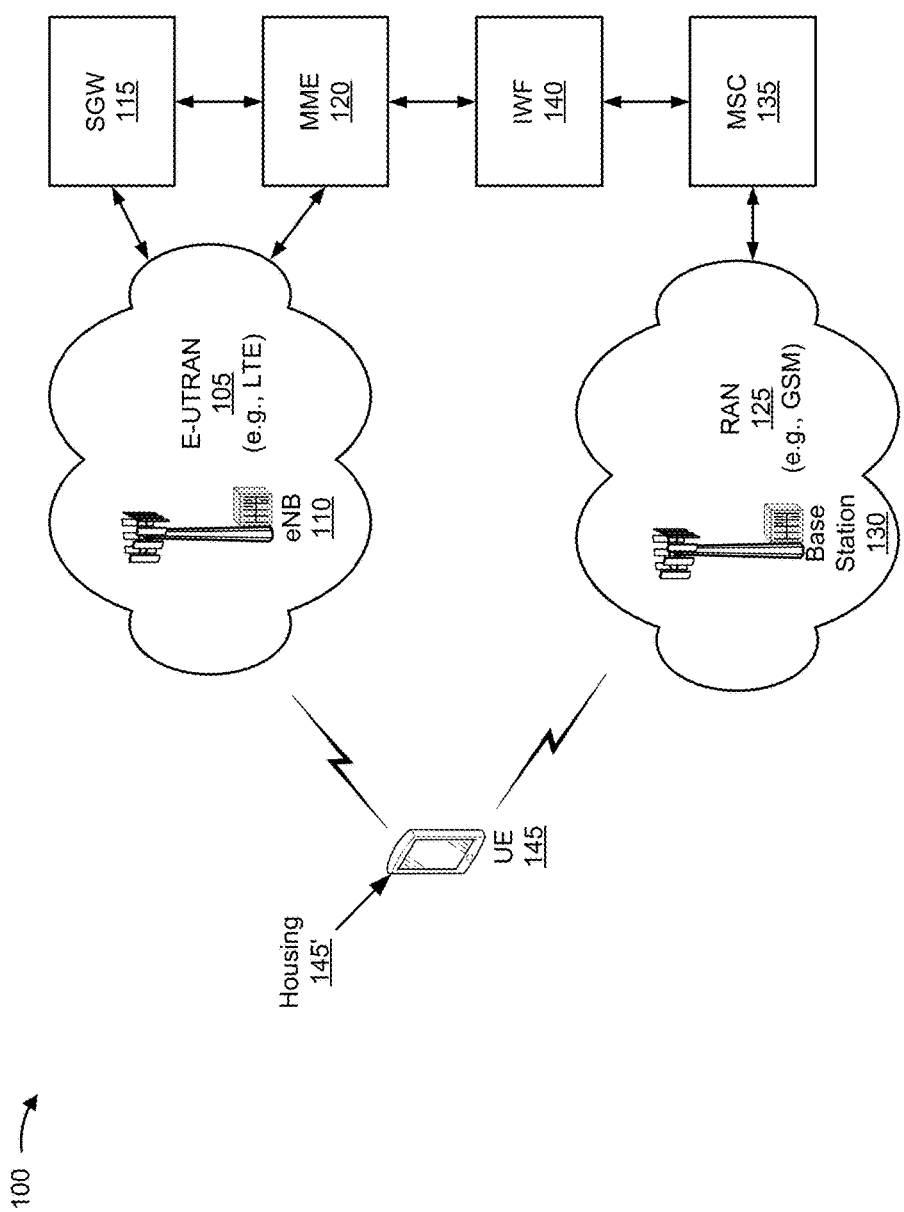
FIG. 1 is a diagram illustrating an example deployment in which multiple wireless networks have overlapping coverage, in accordance with various aspects of the present disclosure.

FIG. 1 is a diagram illustrating an example deployment 100 in which multiple wireless networks have overlapping coverage, in accordance with various aspects of the present disclosure. However, wireless networks may not have overlapping coverage in aspects. As shown, example deployment 100 may include an evolved universal terrestrial radio access network (E-UTRAN) 105, which may include one or more evolved Node Bs (eNBs) 110, and which may communicate with other devices or networks via a serving gateway (SGW) 115 and/or a mobility management entity (MME) 120. As further shown, example deployment 100 may include a radio access network (RAN) 125, which may include one or more base stations 130, and which may communicate with other devices or networks via a mobile switching center (MSC) 135 and/or an inter-working function (IWF) 140. As further shown, example deployment 100 may include one or more user equipment (UEs) 145 capable of communicating via E-UTRAN 105 and/or RAN 125.

E-UTRAN 105 may support, for example, LTE or another type of RAT. E-UTRAN 105 may include eNBs 110 and other network entities that can support wireless communication for UEs 145. Each eNB 110 may provide communication coverage for a particular geographic area. The term "cell" may refer to a coverage area of eNB 110 and/or an eNB subsystem serving the coverage area on a specific frequency channel.

SGW 115 may communicate with E-UTRAN 105 and may perform various functions, such as packet routing and forwarding, mobility anchoring, packet buffering, initiation of network-triggered services, and/or the like. MME 120 may communicate with E-UTRAN 105 and SGW 115 and may perform various functions, such as mobility management, bearer management, distribution of paging messages, security control, authentication, gateway selection, and/or the like, for UEs 145 located within a geographic region served by MME 120 of E-UTRAN 105. The network entities in LTE are described in 3GPP TS 36.300, entitled "Evolved Universal Terrestrial Radio Access (E-UTRA) and Evolved Universal Terrestrial Radio Access Network (E-UTRAN); Overall description," which is publicly available.

RAN 125 may support, for example, GSM or another type of RAT. RAN 125 may include base stations 130 and other network entities that can support wireless communication for UEs 145. MSC 135 may communicate with RAN 125 and may perform various functions, such as voice services, routing for circuit-switched calls, and mobility management for UEs 145 located within a geographic region served by MSC 135 of RAN 125. In some aspects, IWF 140 may facilitate communication between MME 120 and MSC 135 (e.g., when E-UTRAN 105 and RAN 125 use different RATs). Additionally, or alternatively, MME 120 may communicate directly with an MME that interfaces with RAN 125, for example, without IWF 140 (e.g., when E-UTRAN 105 and RAN 125 use a same RAT). In some aspects, E-UTRAN 105 and RAN 125 may use the same frequency and/or the same RAT to communicate with UE 145. In some aspects, E-UTRAN 105 and RAN 125 may use different frequencies and/or RATs to communicate with UEs 145. As used herein, the term base station is not tied to any particular RAT, and may refer to an eNB (e.g., of an LTE network) or another type of base station associated with a different type of RAT.

In general, any number of wireless networks may be deployed in a given geographic area. Each wireless network may support a particular RAT and may operate on one or more frequencies. A RAT may also be referred to as a radio technology, an air interface, and/or the like. A frequency or frequency ranges may also be referred to as a carrier, a frequency channel, and/or the like. Each frequency or frequency range may support a single RAT in a given geographic area in order to avoid interference between wireless networks of different RATs.

UE 145 may be stationary or mobile and may also be referred to as a mobile station, a terminal, an access terminal, a wireless communication device, a subscriber unit, a station, and/or the like. UE 145 may be a cellular phone, a personal digital assistant (PDA), a wireless modem, a wireless communication device, a handheld device, a laptop computer, a cordless phone, a wireless local loop (WLL) station, and/or the like. UE 145 may be included inside a housing 145' that houses components of UE 145, such as processor components, memory components, and/or the like.

Upon power up, UE 145 may search for wireless networks from which UE 145 can receive communication services. If UE 145 detects more than one wireless network, then a wireless network with the highest priority may be selected to serve UE 145 and may be referred to as the serving network. UE 145 may perform registration with the serving network, if necessary. UE 145 may then operate in a connected mode to actively communicate with the serving network. Alternatively, UE 145 may operate in an idle mode and camp on the serving network if active communication is not required by UE 145.

UE 145 may operate in the idle mode as follows. UE 145 may identify all frequencies/RATs on which it is able to find a "suitable" cell in a normal scenario or an "acceptable" cell in an emergency scenario, where "suitable" and "acceptable" are specified in the LTE standards. UE 145 may then camp on the frequency/RAT with the highest priority among all identified frequencies/RATs. UE 145 may remain camped on this frequency/RAT until either (i) the frequency/RAT is no longer available at a predetermined threshold or (ii) another frequency/RAT with a higher priority reaches this threshold. In some aspects, UE 145 may receive a neighbor list when operating in the idle mode, such as a neighbor list included in a system information block type 5 (SIB 5) provided by an eNB of a RAT on which UE 145 is camped. Additionally, or alternatively, UE 145 may generate a neighbor list. A neighbor list may include information identifying one or more frequencies, at which one or more RATs may be accessed, priority information associated with the one or more RATs, and/or the like.

The number and arrangement of devices and networks shown in FIG. 1 are provided as an example. In practice, there may be additional devices and/or networks, fewer devices and/or networks, different devices and/or networks, or differently arranged devices and/or networks than those shown in FIG. 1. Furthermore, two or more devices shown in FIG. 1 may be implemented within a single device, or a single device shown in FIG. 1 may be implemented as multiple, distributed devices. Additionally, or alternatively, a set of devices (e.g., one or more devices) shown in FIG. 1 may perform one or more functions described as being performed by another set of devices shown in FIG. 1.

Figure 2:
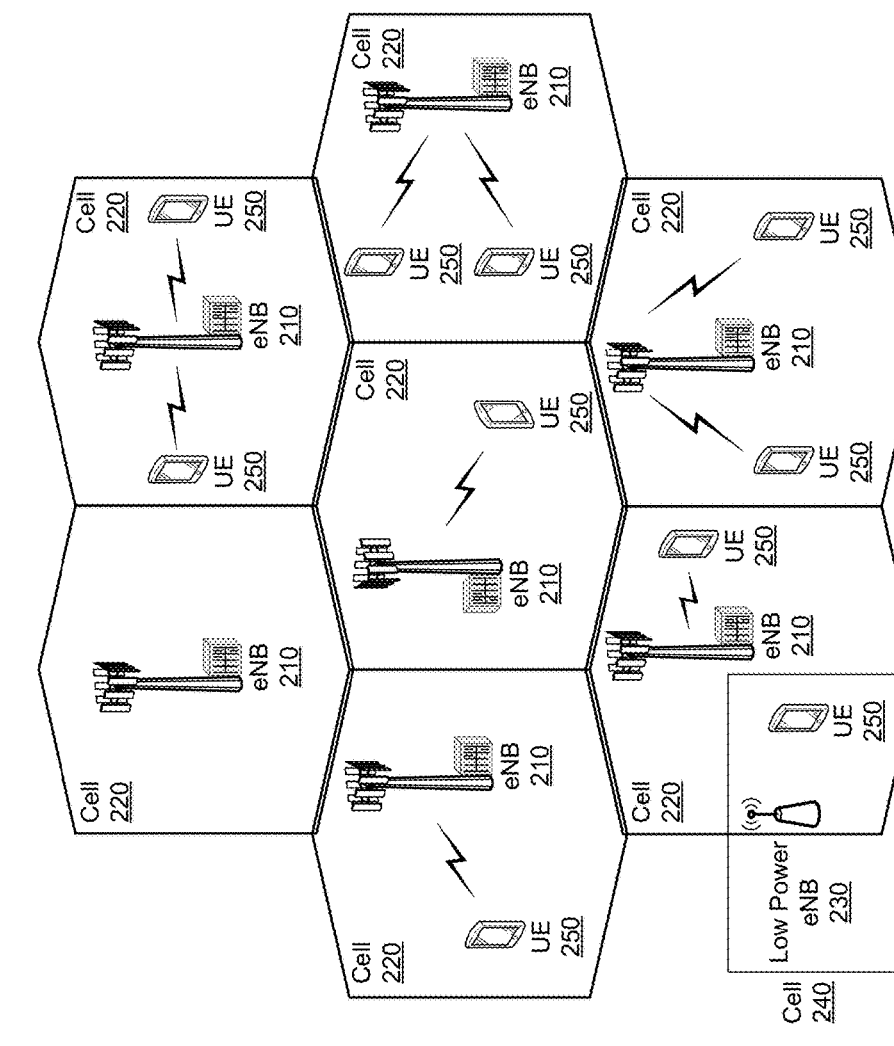
FIG. 2 is a diagram illustrating an example access network in an LTE network architecture, in accordance with various aspects of the present disclosure.

FIG. 2 is a diagram illustrating an example access network 200 in an LTE network architecture, in accordance with various aspects of the present disclosure. As shown, access network 200 may include one or more eNBs 210 (sometimes referred to as "base stations" herein) that serve a corresponding set of cellular regions (cells) 220, one or more low power eNBs 230 that serve a corresponding set of cells 240, and a set of UEs 250.

Each eNB 210 may be assigned to a respective cell 220 and may be configured to provide an access point to a RAN. For example, eNB 110, 210 may provide an access point for UE 145, 250 to E-UTRAN 105 (e.g., eNB 210 may correspond to eNB 110, shown in FIG. 1) or may provide an access point for UE 145, 250 to RAN 125 (e.g., eNB 210 may correspond to base station 130, shown in FIG. 1). In some cases, the terms base station and eNB may be used interchangeably, and a base station, as used herein, is not tied to any particular RAT. UE 145, 250 may correspond to UE 145, shown in FIG. 1. FIG. 2 does not illustrate a centralized controller for example access network 200, but access network 200 may use a centralized controller in some aspects. The eNBs 210 may perform radio related functions including radio bearer control, admission control, mobility control, scheduling, security, and network connectivity (e.g., to SGW 115).

As shown in FIG. 2, one or more low power eNBs 230 may serve respective cells 240, which may overlap with one or more cells 220 served by eNBs 210. The eNBs 230 may correspond to eNB 110 associated with E-UTRAN 105 and/or base station 130 associated with RAN 125, shown in FIG. 1. A low power eNB 230 may be referred to as a remote radio head (RRH). The low power eNB 230 may include a femto cell eNB (e.g., home eNB (HeNB)), a pico cell eNB, a micro cell eNB, and/or the like.

A modulation and multiple access scheme employed by access network 200 may vary depending on the particular telecommunications standard being deployed. In LTE applications, OFDM is used on the downlink (DL) and SC-FDMA is used on the uplink (UL) to support both frequency division duplexing (FDD) and time division duplexing (TDD). The various concepts presented herein are well suited for LTE applications. However, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. As another example, these concepts may also be extended to UTRA employing WCDMA and other variants of CDMA (e.g., such as TD-SCDMA, GSM employing TDMA, E-UTRA, and/or the like), UMB, IEEE 802.11 (Wi-Fi), IEEE 802.16 (WiMAX), IEEE 802.20, Flash-OFDM employing OFDMA, and/or the like. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The eNBs 210 may have multiple antennas supporting MIMO technology. The use of MIMO technology enables eNBs 210 to exploit the spatial domain to support spatial multiplexing, beamforming, and transmit diversity. Spatial multiplexing may be used to transmit different streams of data simultaneously on the same frequency. The data streams may be transmitted to a single UE 145, 250 to increase the data rate or to multiple UEs 250 to increase the overall system capacity. This may be achieved by spatially precoding each data stream (e.g., applying a scaling of an amplitude and a phase) and then transmitting each spatially precoded stream through multiple transmit antennas on the DL. The spatially precoded data streams arrive at the UE(s) 250 with different spatial signatures, which enables each of the UE(s) 250 to recover the one or more data streams destined for that UE 145, 250. On the UL, each UE 145, 250 transmits a spatially precoded data stream, which enables eNBs 210 to identify the source of each spatially precoded data stream.

Spatial multiplexing is generally used when channel conditions are good. When channel conditions are less favorable, beamforming may be used to focus the transmission energy in one or more directions. This may be achieved by spatially precoding the data for transmission through multiple antennas. To achieve good coverage at the edges of the cell, a single stream beamforming transmission may be used in combination with transmit diversity.

In the detailed description that follows, various aspects of an access network will be described with reference to a MIMO system supporting OFDM on the DL. OFDM is a spread-spectrum technique that modulates data over a number of subcarriers within an OFDM symbol. The subcarriers are spaced apart at precise frequencies. The spacing provides "orthogonality" that enables a receiver to recover the data from the subcarriers. In the time domain, a guard interval (e.g., cyclic prefix) may be added to each OFDM symbol to combat inter-OFDM-symbol interference. The UL may use SC-FDMA in the form of a DFT-spread OFDM signal to compensate for high peak-to-average power ratio (PAPR).

The number and arrangement of devices and cells shown in FIG. 2 are provided as an example. In practice, there may be additional devices and/or cells, fewer devices and/or cells, different devices and/or cells, or differently arranged devices and/or cells than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) shown in FIG. 2 may perform one or more functions described as being performed by another set of devices shown in FIG. 2.

Figure 3:
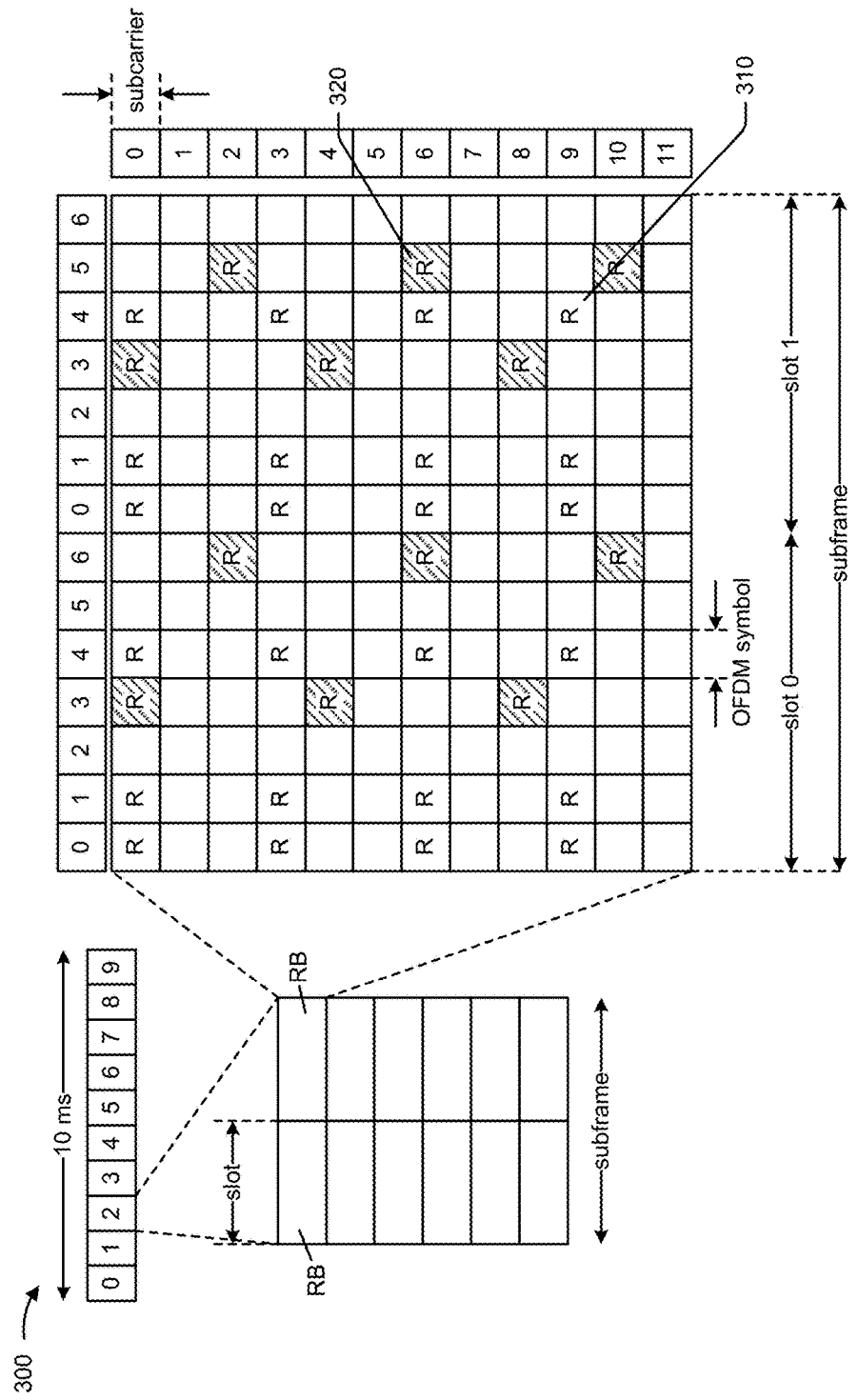
FIG. 3 is a diagram illustrating an example of a downlink frame structure in LTE, in accordance with various aspects of the present disclosure.

FIG. 3 is a diagram illustrating an example 300 of a downlink (DL) frame structure in LTE, in accordance with various aspects of the present disclosure. A frame (e.g., of 10 ms) may be divided into 10 equally sized sub-frames with indices of 0 through 9. Each sub-frame may include two consecutive time slots. A resource grid may be used to represent two time slots, each time slot including a resource block (RB). The resource grid is divided into multiple resource elements. In LTE, a resource block includes 12 consecutive subcarriers in the frequency domain and, for a normal cyclic prefix in each OFDM symbol, 7 consecutive OFDM symbols in the time domain, or 84 resource elements. For an extended cyclic prefix, a resource block includes 6 consecutive OFDM symbols in the time domain and has 72 resource elements. Some of the resource elements, as indicated as R 310 and R 320, include DL reference signals (DL-RS). The DL-RS include Cell-specific RS (CRS) (also sometimes called common RS) 310 and UE-specific RS (UE-RS) 320. UE-RS 320 are transmitted only on the resource blocks upon which the corresponding physical DL shared channel (PDSCH) is mapped. The number of bits carried by each resource element depends on the modulation scheme. Thus, the more resource blocks that a UE receives and the higher the modulation scheme, the higher the data rate for the UE.

In LTE, an eNB may send a primary synchronization signal (PSS) and a secondary synchronization signal (SSS) for each cell in the eNB. The primary and secondary synchronization signals may be sent in symbol periods 6 and 5, respectively, in each of subframes 0 and 5 of each radio frame with the normal cyclic prefix (CP). The synchronization signals may be used by UEs for cell detection and acquisition. The eNB may send a Physical Broadcast Channel (PBCH) in symbol periods 0 to 3 in slot 1 of subframe 0. The PBCH may carry certain system information.

The eNB may send a Physical Control Format Indicator Channel (PCFICH) in the first symbol period of each subframe. The PCFICH may convey the number of symbol periods (M) used for control channels, where M may be equal to 1, 2 or 3 and may change from subframe to subframe. M may also be equal to 4 for a small system bandwidth, e.g., with less than 10 resource blocks. The eNB may send a Physical HARQ Indicator Channel (PHICH) and a Physical Downlink Control Channel (PDCCH) in the first M symbol periods of each subframe. The PHICH may carry information to support hybrid automatic repeat request (HARQ). The PDCCH may carry information on resource allocation for UEs and control information for downlink channels. The eNB may send a Physical Downlink Shared Channel (PDSCH) in the remaining symbol periods of each subframe. The PDSCH may carry data for UEs scheduled for data transmission on the downlink.

The eNB may send the PSS, SSS, and PBCH in the center 1.08 MHz of the system bandwidth used by the eNB. The eNB may send the PCFICH and PHICH across the entire system bandwidth in each symbol period in which these channels are sent. The eNB may send the PDCCH to groups of UEs in certain portions of the system bandwidth. The eNB may send the PDSCH to specific UEs in specific portions of the system bandwidth. The eNB may send the PSS, SSS, PBCH, PCFICH, and PHICH in a broadcast manner to all UEs, may send the PDCCH in a unicast manner to specific UEs, and may also send the PDSCH in a unicast manner to specific UEs.

A number of resource elements may be available in each symbol period. Each resource element (RE) may cover one subcarrier in one symbol period and may be used to send one modulation symbol, which may be a real or complex value. Resource elements not used for a reference signal in each symbol period may be arranged into resource element groups (REGs). Each REG may include four resource elements in one symbol period. The PCFICH may occupy four REGs, which may be spaced approximately equally across frequency, in symbol period 0. The PHICH may occupy three REGs, which may be spread across frequency, in one or more configurable symbol periods. For example, the three REGs for the PHICH may all belong in symbol period 0 or may be spread in symbol periods 0, 1, and 2. The PDCCH may occupy 9, 18, 36, or 72 REGs, which may be selected from the available REGs, in the first M symbol periods, for example. Only certain combinations of REGs may be allowed for the PDCCH.

A UE may know the specific REGs used for the PHICH and the PCFICH. The UE may search different combinations of REGs for the PDCCH. The number of combinations to search is typically less than the number of allowed combinations for the PDCCH. An eNB may send the PDCCH to the UE in any of the combinations that the UE will search.

As indicated above, FIG. 3 is provided as an example. Other examples are possible and may differ from what was described above in connection with FIG. 3.

Figure 4:
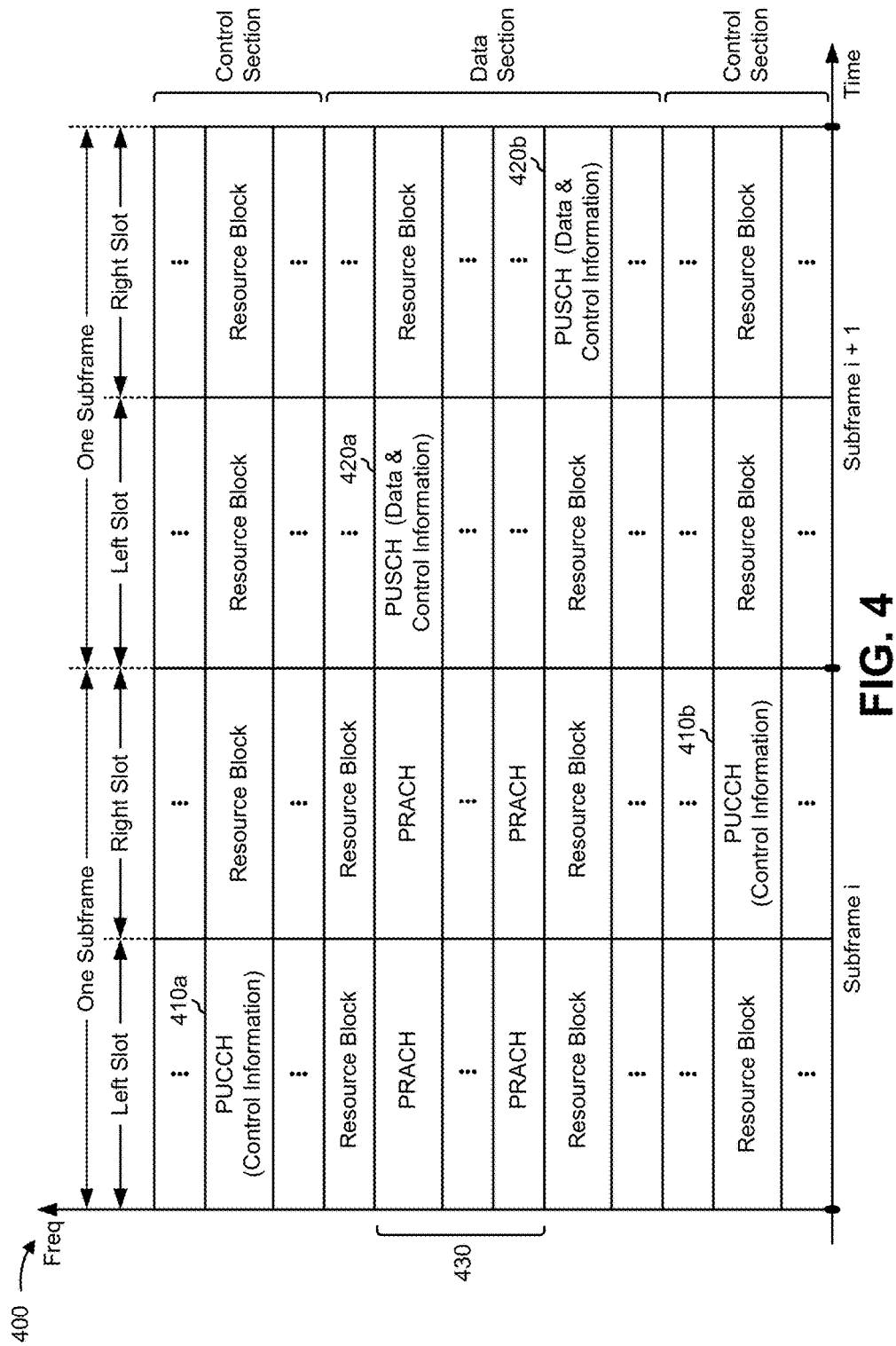
FIG. 4 is a diagram illustrating an example of an uplink frame structure in LTE, in accordance with various aspects of the present disclosure.

FIG. 4 is a diagram illustrating an example 400 of an uplink (UL) frame structure in LTE, in accordance with various aspects of the present disclosure. The available resource blocks for the UL may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The UL frame structure results in the data section including contiguous subcarriers, which may allow a single UE to be assigned all of the contiguous subcarriers in the data section.

A UE may be assigned resource blocks 410a, 410b in the control section to transmit control information to an eNB. The UE may also be assigned resource blocks 420a, 420b in the data section to transmit data to the eNB. The UE may transmit control information in a physical UL control channel (PUCCH) on the assigned resource blocks in the control section. The UE may transmit only data or both data and control information in a physical UL shared channel (PUSCH) on the assigned resource blocks in the data section. A UL transmission may span both slots of a subframe and may hop across frequencies.

A set of resource blocks may be used to perform initial system access and achieve UL synchronization in a physical random access channel (PRACH) 430. The PRACH 430 carries a random sequence and cannot carry any UL data/ signaling. Each random access preamble occupies a bandwidth corresponding to six consecutive resource blocks. The starting frequency is specified by the network. That is, the transmission of the random access preamble is restricted to certain time and frequency resources. There is no frequency hopping for the PRACH. The PRACH attempt is carried in a single subframe (e.g., of 1 ms) or in a sequence of few contiguous subframes and a UE can make only a single PRACH attempt per frame (e.g., of 10 ms).

As indicated above, FIG. 4 is provided as an example. Other examples are possible and may differ from what was described above in connection with FIG. 4.

Figure 5:
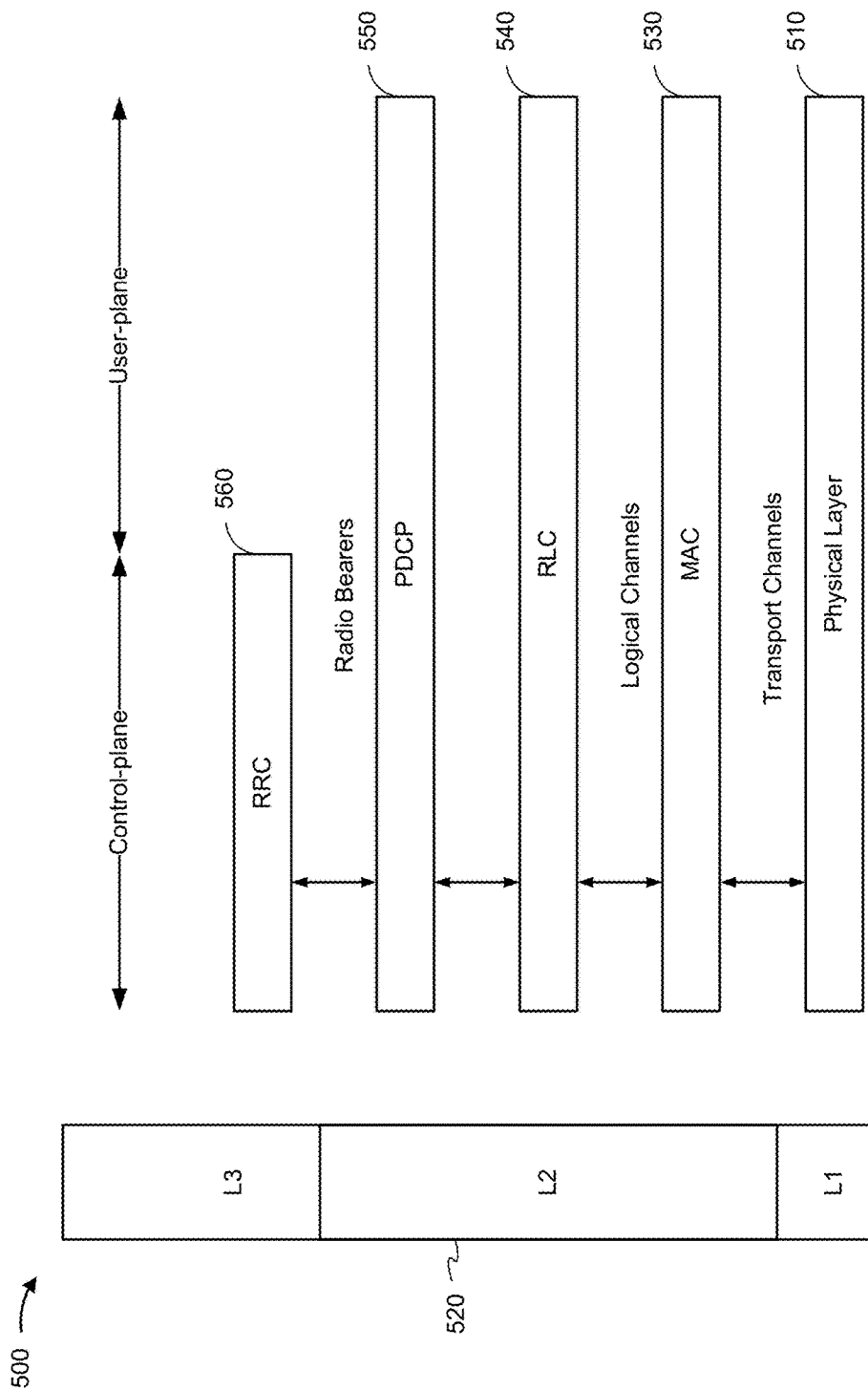
FIG. 5 is a diagram illustrating an example of a radio protocol architecture for a user plane and a control plane in LTE, in accordance with various aspects of the present disclosure.

FIG. 5 is a diagram illustrating an example 500 of a radio protocol architecture for a user plane and a control plane in LTE, in accordance with various aspects of the present disclosure. The radio protocol architecture for the UE and the eNB is shown with three layers: Layer 1, Layer 2, and Layer 3. Layer 1 (L1 layer) is the lowest layer and implements various physical layer signal processing functions. The L1 layer will be referred to herein as the physical layer 510. Layer 2 (L2 layer) 520 is above the physical layer 510 and is responsible for the link between the UE and eNB over the physical layer 510.

In the user plane, the L2 layer 520 includes, for example, a media access control (MAC) sublayer 530, a radio link control (RLC) sublayer 540, and a packet data convergence protocol (PDCP) sublayer 550, which are terminated at the eNB on the network side. Although not shown, the UE may have several upper layers above the L2 layer 520 including a network layer (e.g., IP layer) that is terminated at a packet data network (PDN) gateway on the network side, and an application layer that is terminated at the other end of the connection (e.g., a far end UE, a server, and/or the like).

The PDCP sublayer 550 provides retransmission of lost data in handover. The PDCP sublayer 550 also provides header compression for upper layer data packets to reduce radio transmission overhead, security by ciphering the data packets, and handover support for UEs between eNBs. The RLC sublayer 540 provides segmentation and reassembly of upper layer data packets, retransmission of lost data packets, and reordering of data packets to compensate for out-of-order reception due to hybrid automatic repeat request (HARQ). The MAC sublayer 530 provides multiplexing between logical and transport channels. The MAC sublayer 530 is also responsible for allocating the various radio resources (e.g., resource blocks) in one cell among the UEs. The MAC sublayer 530 is also responsible for HARQ operations.

In the control plane, the radio protocol architecture for the UE and eNB is substantially the same for the physical layer 510 and the L2 layer 520 with the exception that there is no header compression function for the control plane. The control plane also includes a radio resource control (RRC) sublayer 560 in Layer 3 (L3 layer). The RRC sublayer 560 is responsible for obtaining radio resources (i.e., radio bearers) and for configuring the lower layers using RRC signaling between the eNB and the UE.

As indicated above, FIG. 5 is provided as an example. Other examples are possible and may differ from what was described above in connection with FIG. 5.

Figure 6:
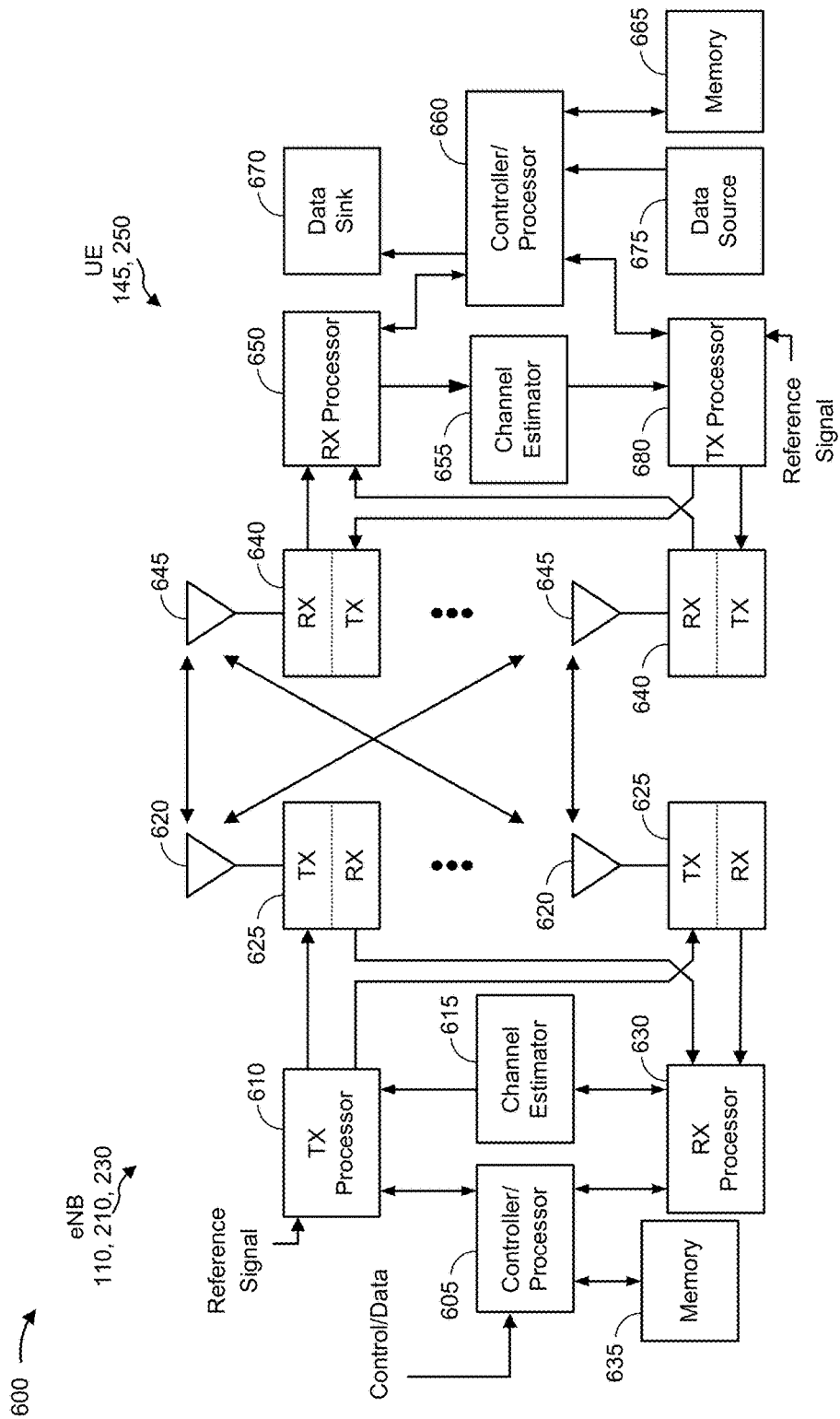
FIG. 6 is a diagram illustrating example components of an evolved Node B and a user equipment in an access network, in accordance with various aspects of the present disclosure.

FIG. 6 is a diagram illustrating example components 600 of a base station such as an eNB 110, 210, 230 and a UE 145, 250 in an access network, in accordance with various aspects of the present disclosure. As shown in FIG. 6, eNB 110, 210, 230 may include a controller/processor 605, a TX processor 610, a channel estimator 615, an antenna 620, a transmitter 625TX, a receiver 625RX, an RX processor 630, and a memory 635. As further shown in FIG. 6, UE 145, 250 may include a receiver RX, for example, of a transceiver TX/RX 640, a transmitter TX, for example, of a transceiver TX/RX 640, an antenna 645, an RX processor 650, a channel estimator 655, a controller/processor 660, a memory 665, a data sink 670, a data source 675, and a TX processor 680.

In the DL, upper layer packets from the core network are provided to controller/processor 605. The controller/processor 605 implements the functionality of the L2 layer. In the DL, the controller/processor 605 provides header compression, ciphering, packet segmentation and reordering, multiplexing between logical and transport channels, and radio resource allocations to the UE 145, 250 based, at least in part, on various priority metrics. The controller/processor 605 is also responsible for HARQ operations, retransmission of lost packets, and signaling to the UE 145, 250.

The TX processor 610 implements various signal processing functions for the L1 layer (e.g., physical layer). The signal processing functions includes coding and interleaving to facilitate forward error correction (FEC) at the UE 145, 250 and mapping to signal constellations based, at least in part, on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 615 may be used to determine the coding and modulation scheme, as well as for spatial processing. The channel estimate may be derived from a reference signal and/or channel condition feedback transmitted by the UE 145, 250. Each spatial stream is then provided to a different antenna 620 via a separate transmitter TX, for example, of transceiver TX/RX 625. Each such transmitter TX modulates an RF carrier with a respective spatial stream for transmission.

At the UE 145, 250, each receiver RX, for example, of a transceiver TX/RX 640 receives a signal through its respective antenna 645. Each such receiver RX recovers information modulated onto an RF carrier and provides the information to the receiver (RX) processor 650. The RX processor 650 implements various signal processing functions of the L1 layer. The RX processor 650 performs spatial processing on the information to recover any spatial streams destined for the UE 145, 250. If multiple spatial streams are destined for the UE 145, 250, the spatial streams may be combined by the RX processor 650 into a single OFDM symbol stream. The RX processor 650 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the eNB 110, 210, 230. These soft decisions may be based, at least in part, on channel estimates computed by the channel estimator 655. The soft decisions are then decoded and deinterleaved to recover the data and control signals that were originally transmitted by the eNB 110, 210, 230 on the physical channel. The data and control signals are then provided to the controller/processor 660.

The controller/processor 660 implements the L2 layer. The controller/processor 660 can be associated with a memory 665 that stores program codes and data. The memory 665 may include a non-transitory computer-readable medium. In the UL, the controller/processor 660 provides demultiplexing between transport and logical channels, packet reassembly, deciphering, header decompression, control signal processing to recover upper layer packets from the core network. The upper layer packets are then provided to a data sink 670, which represents all the protocol layers above the L2 layer. Various control signals may also be provided to the data sink 670 for L3 processing. The controller/processor 660 is also responsible for error detection using an acknowledgement (ACK) and/or negative acknowledgement (NACK) protocol to support HARQ operations.

In the UL, a data source 675 is used to provide upper layer packets to the controller/processor 660. The data source 675 represents all protocol layers above the L2 layer. Similar to the functionality described in connection with the DL transmission by the eNB 110, 210, 230, the controller/processor 660 implements the L2 layer for the user plane and the control plane by providing header compression, ciphering, packet segmentation and reordering, and multiplexing between logical and transport channels based, at least in part, on radio resource allocations by the eNB 110, 210, 230. The controller/processor 660 is also responsible for HARQ operations, retransmission of lost packets, and signaling to the eNB 110, 210, 230.

Channel estimates derived by a channel estimator 655 from a reference signal or feedback transmitted by the eNB 110, 210, 230 may be used by the TX processor 680 to select the appropriate coding and modulation schemes, and to facilitate spatial processing. The spatial streams generated by the TX processor 680 are provided to different antenna 645 via separate transmitters TX, for example, of transceivers TX/RX 640. Each transmitter TX, for example, of transceiver TX/RX 640 modulates an RF carrier with a respective spatial stream for transmission.

The UL transmission is processed at the eNB 110, 210, 230 in a manner similar to that described in connection with the receiver function at the UE 145, 250. Each receiver RX, for example, of transceiver TX/RX 625 receives a signal through its respective antenna 620. Each receiver RX, for example, of transceiver TX/RX 625 recovers information modulated onto an RF carrier and provides the information to a RX processor 630. The RX processor 630 may implement the L1 layer.

The controller/processor 605 implements the L2 layer. The controller/processor 605 can be associated with a memory 635 that stores program code and data. The memory 635 may be referred to as a computer-readable medium. In the UL, the controller/processor 605 provides demultiplexing between transport and logical channels, packet reassembly, deciphering, header decompression, control signal processing to recover upper layer packets from the UE 145, 250. Upper layer packets from the controller/processor 605 may be provided to the core network. The controller/processor 605 is also responsible for error detection using an ACK and/or NACK protocol to support HARQ operations.

In some aspects, one or more components of UE 145, 250 may be included in a housing 145', as shown in FIG. 1. One or more components of UE 145, 250 may be configured to perform tune-away management, as described in more detail elsewhere herein. For example, the controller/processor 660 and/or other processors and modules of UE 145, 250 may perform or direct operations of, for example, process 800 of FIG. 8, process 900 of FIG. 9, and/or other processes as described herein. In some aspects, one or more of the components shown in FIG. 6 may be employed to perform, for example, process 800 of FIG. 8, process 900 of FIG. 9, and/or other processes for the techniques described herein.

In some aspects, UE 145, 250 may include means for determining a predicted tune-away for a set of voice frames, means for altering a vocoder rate from a first vocoder rate to a second vocoder rate that is less than the first vocoder rate based at least in part on determining the predicted tune-away for the set of voice frames, means for dropping, in connection with an occurrence of the predicted tune-away, a subset of packets for a time period corresponding to the predicted tune-away, and/or the like. In some aspects, such means may include one or more components of UE 145, 250 described in connection with FIG. 6.

The number and arrangement of components shown in FIG. 6 are provided as an example. In practice, there may be additional components, fewer components, different components, or differently arranged components than those shown in FIG. 6. Furthermore, two or more components shown in FIG. 6 may be implemented within a single component, or a single component shown in FIG. 6 may be implemented as multiple, distributed components. Additionally, or alternatively, a set of components (e.g., one or more components) shown in FIG. 6 may perform one or more functions described as being performed by another set of components shown in FIG. 6.

During a call, such as a voice over long term evolution (VoLTE) call, voice frames may be transported using packets. For example, 20 millisecond (ms) voice frames may be transported using real-time transport protocol (RTP), user datagram protocol (UDP), Internet protocol (IP), and/or the like. A BS may enable semi-persistent scheduling (SPS) to allocate bandwidth for transporting packets of a VoLTE call. For example, the BS may configure an uplink bandwidth sequence, periodically provide an uplink grant to a UE, and/or the like in an SPS mode. In this case, each periodic uplink grant of bandwidth for the UE may enable the UE to provide a packet. For example, the UE may encapsulate a single 20 ms voice frame into a single IP packet for transport to a network using a single uplink grant.

In some cases, a UE may be configured to tune-away from a serving BS, for example, to monitor for a reference signal. For example, when the UE is a single radio dual subscriber identification module dual standby (DSDS) type of UE, the UE may tune from the serving BS to scan for other coverage, monitor for a reference signal from another BS, and/or the like. However, a tune-away may interrupt transmission of a voice frame via a packet in a VoLTE service. For example, a tune-away from an LTE signal to a GSM signal, a 1× signal, and/or the like may cause a packet delay. Additionally, or alternatively, when the BS fails to provide a threshold amount of resources via a dynamic uplink grant or a configured SPS periodic uplink grant, the UE may drop one or more packets as a result of the tune-away. Additionally, or alternatively, the UE may fail to receive one or more packets as a result of the tune-away.

Some aspects, described herein, may enable tune-away management. For example, in some aspects, described herein, a UE may predict a tune-away for a set of voice frames, and may perform a response action based at least in part on predicting the tune-away. In this case, the response action may include altering a vocoder rate, dropping a particular selected subset of packets, enabling redundancy for a particular selected subset of packets, signaling a channel aware mode to enable packet recovery, and/or the like.

Figure 7A:
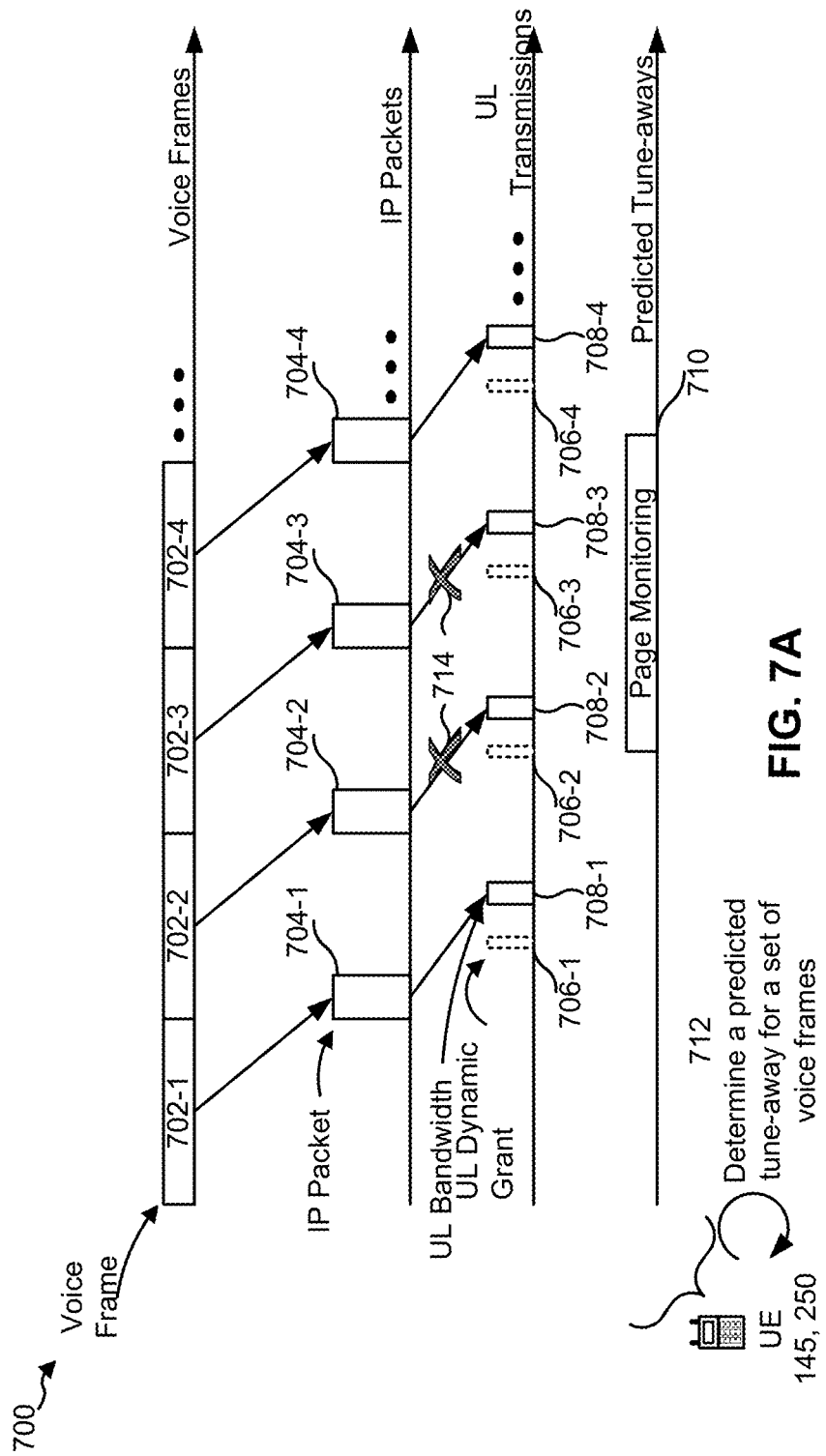
FIGS. 7A-7C are diagrams illustrating an example of tune-away management, in accordance with various aspects of the present disclosure.
Figure 7B:
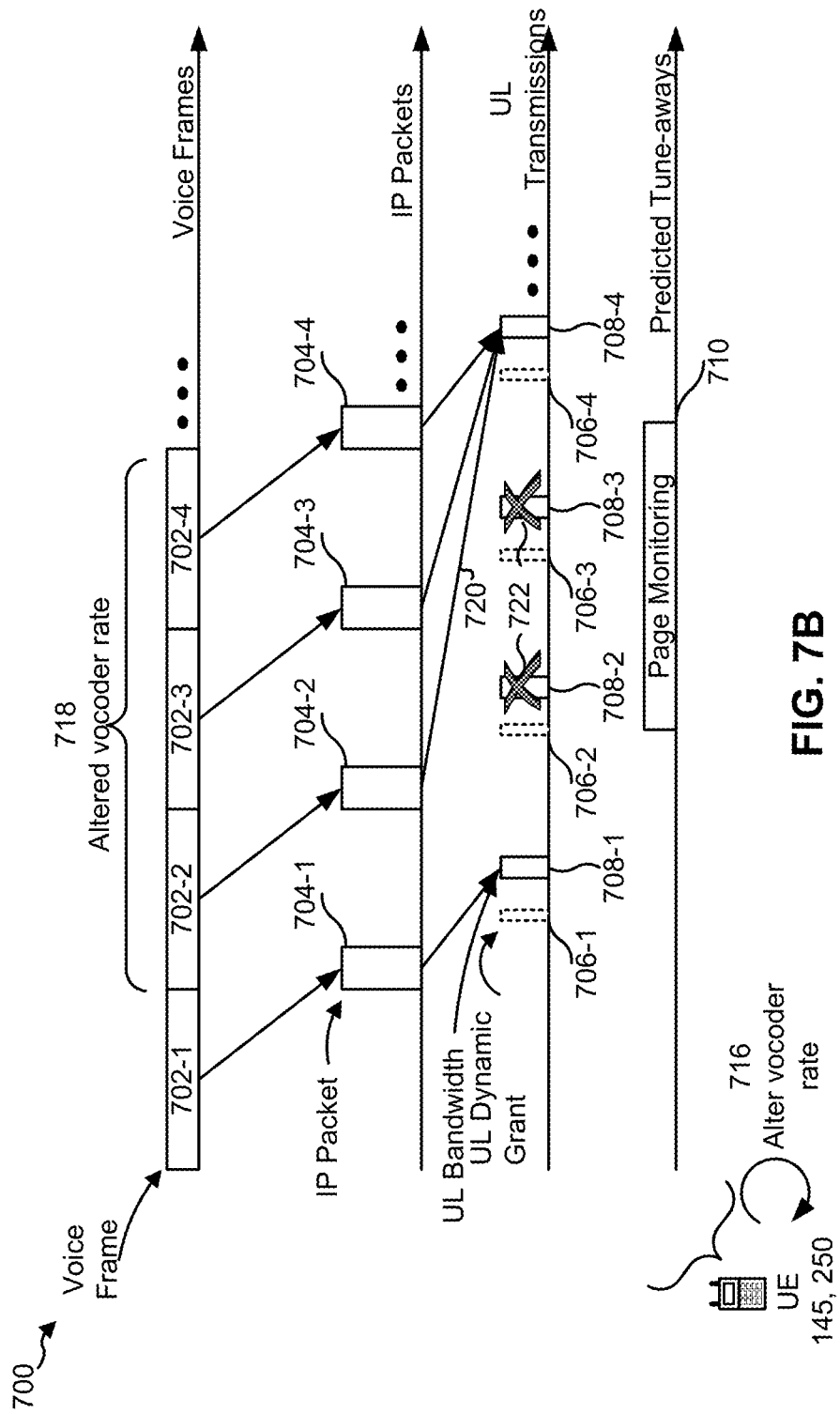
Figure 7C:
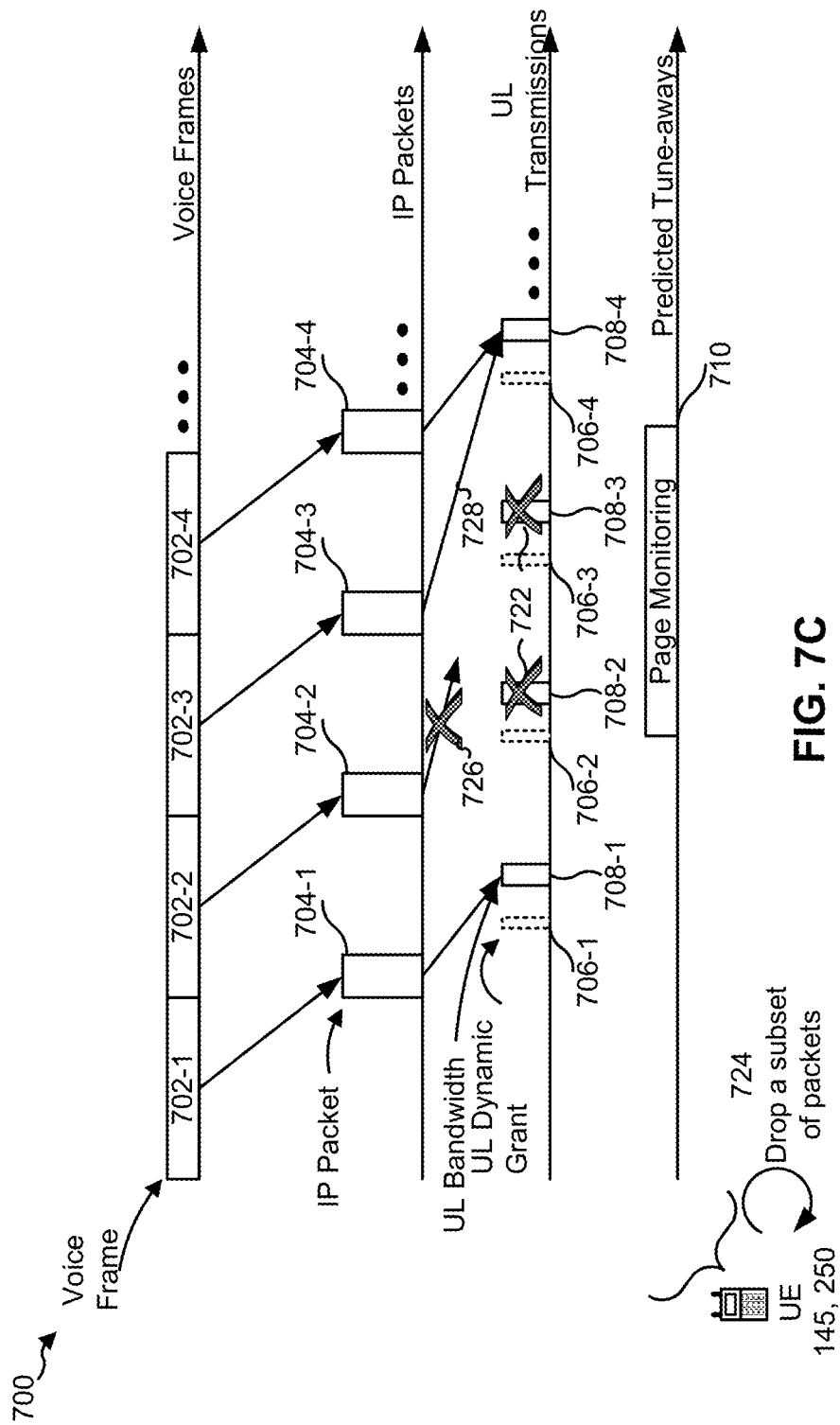

FIGS. 7A-7C are diagrams illustrating an example 700 of tune-away management, in accordance with various aspects of the present disclosure. As shown in FIG. 7A, example 700 may include a UE 145, 250.

As further shown in FIG. 7A, UE 145, 250 may perform a VoLTE call. For example, the VoLTE call may include a set of voice frames 702 (shown as voice frames 702-1 through 702-4). Each voice frame 702 may correspond to an IP packet 704 (shown as 704-1 through 704-4). In some aspects, UE 145, 250 may operate in an SPS mode. For example, UE 145, 250 may receive a set of dynamic uplink grants 706 (shown as 706-1 through 706-4) and a set of periodic uplink grants 708 (shown as 708-1 through 708-4). In some aspects, each IP packet 704 may be scheduled for transmission using a corresponding periodic uplink grant 708. UE 145, 250 may be scheduled for a page monitoring period 710.

As further shown in FIG. 7A, and by reference number 712, UE 145, 250 may determine a predicted tune-away for a set of voice frames. For example, UE 145, 250 may determine that page monitoring period 710 is scheduled for a period concurrent with periodic uplink grants 708-2 and 708-3. In this case, UE 145, 250 may determine that page monitoring period 710 is predicted to cause a tune-away from transmission of IP packets 704-2 and 704-3 to convey voice frames 702-2 and 702-3, respectively. In some aspects, UE 145, 250 may determine that the predicted tune-away is to cause a subset of packets of IP packets 704-1 through 704-4 to be dropped. As shown by reference number 714, UE 145, 250 may determine that IP packets 704-2 and 704-3 corresponding to periodic uplink grants 708-2 and 708-3, respectively, may be dropped as a result of a tune-away in connection with page monitoring period 710.

In some aspects, UE 145, 250 may predict the tune-away based at least in part on a schedule for a paging cycle. For example, after a first tune-away, UE 145, 250 may predict a second tune-away based at least in part on a start time of the first tune-away and/or a configured duration for the paging cycle. In some aspects, UE 145, 250 may determine the duration for the paging cycle. For example, based at least in part on a duration between two or more previous tune-aways, UE 145, 250 may determine a duration for one or more upcoming tune-aways. In some aspects, UE 145, 250 may predict the tune-away based at least in part on a cell change. For example, based at least in part on a cell change, UE 145, 250 may adjust a prediction for a timing of a predicted tune-away. In this way, UE 145, 250 accounts for different timings associated with different cells. In some aspects, UE 145, 250 may determine that a call is a VoLTE call. For example, based at least in part on an IMS call set up message or a radio bearer activation (e.g., a radio bearer with a quality of service (QoS) Class Identifier (QCI) value 1), UE 145, 250 may determine that the call is a VoLTE call, which may trigger UE 145, 250 to predict a tune-away.

As shown in FIG. 7B, and by reference number 716, as a response action to determining the predicted tune-away, UE 145, 250 may alter a vocoder rate. For example, based at least in part on determining the predicted tune-away for the VoLTE call, UE 145, 250 may alter the vocoder rate for at least one voice frame 702 from a first vocoder rate to a second vocoder rate that is less than the first vocoder rate. In some aspects, UE 145, 250 may determine a subset of voice frames 702 for which to alter the vocoder rate. For example, UE 145, 250 may alter the vocoder rate for a range of voice frames 702 from a first voice frame 702 that may be affected by the predicted tune-away (e.g., voice frame 702-2) to a last voice frame 702 that may be affected by the predicted tune-away (e.g., voice frame 702-3). In this case, UE 145, 250 may determine a predicted duration of the predicted tune-away, such as a predicted duration of two voice frames 702, to select the range of voice frames 702 for which to alter the vocoder rate. As shown by reference number 718, UE 145, 250 may determine a range that is greater than a duration of the predicted tune-away, such as a range from voice frame 702-2 to voice frame 702-4 to account for a variability in the duration of the predicted tune-away, to reduce a likelihood of prematurely returning to the first vocoder rate, and/or the like.

In some aspects, UE 145, 250 may determine the second vocoder rate based at least in part on an uplink bandwidth allocation. For example, when UE 145, 250 determines that one or more voice frames 702 are to be included in a single uplink transmission (e.g., using a periodic uplink grant 708), UE 145, 250 may determine to reduce the vocoder rate $r$ according to a ratio of $r=1/(D+1)$, where $D$ represents a quantity of voice frames 702 that are to be included in a single transmission. Additionally, or alternatively, UE 145, 250 may determine a codec rate c, according to $c=R/[(D+1)(1+\alpha)]$, where R represents a grant bandwidth (e.g., of a periodic uplink grant 708), and α represents an RTP/UDP/IP and LTE L2 overhead amount. In this case, UE 145, 250 may use an enhanced voice services (EVS) codec. In this way, as shown by reference numbers 720 and 722, UE 145, 250 ensures that IP packets 704-2 and 704-3 conveying voice frames 702-2 and 702-3, respectively, can be included in an uplink transmission using periodic uplink grant 708-4, thereby avoiding an interruption in VoLTE service from the predicted tune-away associated with page monitoring period 710. In this way, UE 145, 250 adjusts voice frame processing adaptively to account for tune-aways, thereby reducing a likelihood of an interruption to the VoLTE service relative to maintaining a constant voice frame processing, and improving voice frame quality relative to using a constant, reduced vocoder rate to account for tune-aways.

As shown in FIG. 7C, and by reference number 724, as another response action to the predicted tune-away, UE 145, 250 may drop a subset of packets. For example, based at least in part on determining the predicted tune-away, UE 145, 250 may select a subset of packets, of IP packets 704-1 through 704-4, and may drop the subset of packets. In this case, as shown by reference numbers 726 and 728, UE 145, 250 may drop IP packet 704-2 from transmission using periodic uplink grant 708-2. In this way, UE 145, 250 may avoid inadvertently dropping one or more other packets of IP packets 704-1 through 704-4. Additionally, or alternatively, UE 145, 250 may drop one or more other IP packets 704-1 through 704-4 occurring before the period of the predicted tune-away, concurrent with the period of the predicted tune-away, after the period of the predicted, tune-away, and/or the like.

In some aspects, UE 145, 250 may drop the subset of packets until uplink bandwidth is available to transport remaining packets. As shown by reference number 728, based at least in part on dropping IP packet 704-2, UE 145, 250 provides IP packet 704-3 using periodic uplink grant 708-4. Additionally, or alternatively, UE 145, 250 may drop a quantity of packets to ensure that a size of a transmission queue does not exceed a threshold size. In this way, UE 145, 250 may maintain a threshold level of delay performance.

In another example, UE 145, 250 may enable partial redundancy as another response action to the predicted tune-away. For example, based at least in part on determining the predicted tune-away, UE 145, 250 may enable a channel aware mode to cover a subset of voice frames 702 that are to be interrupted by the tune-away, and may utilize subsequent periodic uplink grants 708 to provide redundant data corresponding to the subset of voice frames 702. In this case, UE 145, 250 may drop one or more IP packets 704-1 through 704-4 corresponding to voice frames 702-1 through 702-4 that are to be interrupted by the tune-away.

In another example, UE 145, 250 may utilize partial redundancy for avoidance of tune-away related disruptions in downlink transmissions. For example, based at least in part on determining a predicted tune-away in a channel unaware mode, UE 145, 250 may signal a base station (e.g., eNB 110, 210, 230) to enable channel aware mode, and may receive subsequent downlink transmissions in the channel aware mode to ensure redundancy for the subsequent downlink transmissions. In this way, UE 145, 250 reduces a likelihood of an interruption to downlink data in connection with a tune-away.

As indicated above, FIGS. 7A-7C are provided as examples. Other examples are possible and may differ from what was described with respect to FIGS. 7A-7C.

Figure 8:
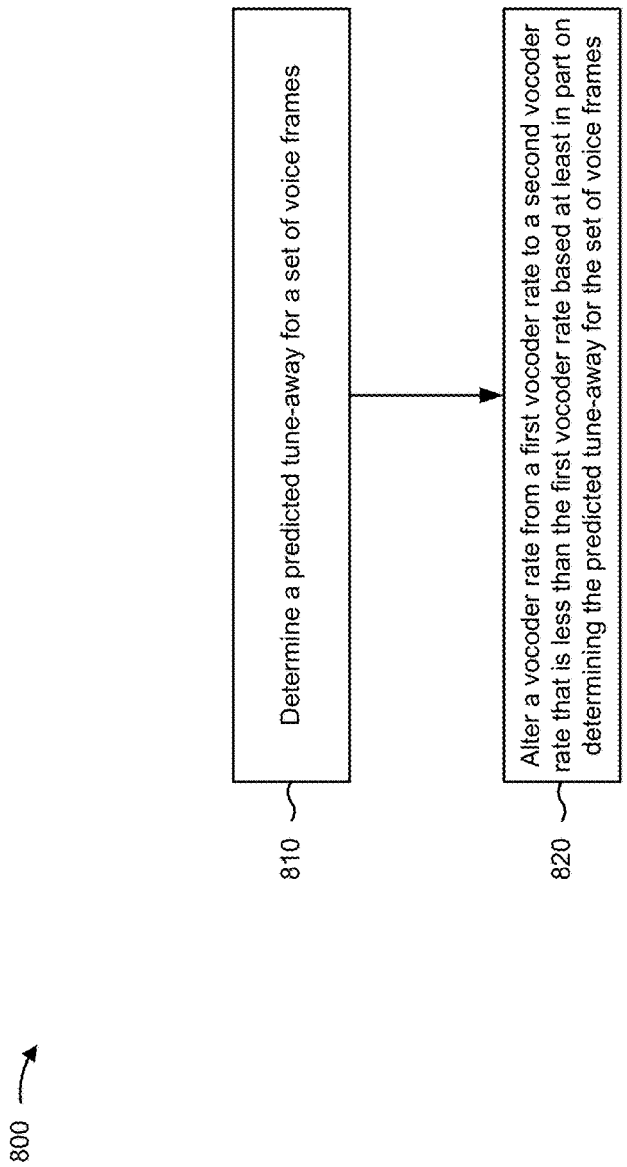
FIG. 8 is a diagram illustrating an example process performed, for example, by a user equipment, in accordance with various aspects of the present disclosure.

FIG. 8 is a diagram illustrating an example process 800 performed, for example, by a UE, in accordance with various aspects of the present disclosure. Example process 800 is an example where a UE (e.g., UE 145, 250) performs tune-away management.

As shown in FIG. 8, in some aspects, process 800 may include determining a predicted tune-away for a set of voice frames (block 810). For example, UE 145, 250 may determine the predicted tune-away for the set of voice frames.

As shown in FIG. 8, in some aspects, process 800 may include altering a vocoder rate from a first vocoder rate to a second vocoder rate that is less than the first vocoder rate based at least in part on determining the predicted tune-away for the set of voice frames (block 820). For example, based at least in part on determining the predicted tune-away for the set of voice frames, UE 145, 250 may alter the vocoder rate from the first vocoder rate to the second vocoder rate. In this case, the second vocoder rate may be less than the first vocoder rate.

Additionally, or alternatively, the second vocoder rate may be determined based at least in part on an uplink bandwidth allocation.

Additionally, or alternatively, the second vocoder rate may be determined based at least in part on a bandwidth grant.

Additionally, or alternatively, the second vocoder rate may be determined based at least in part on an overhead characteristic.

Additionally, or alternatively, the second vocoder rate may be determined based at least in part on the first vocoder rate.

Additionally, or alternatively, the predicted tune-away may be determined based at least in part on a paging cycle and a tune-away start time.

Additionally, or alternatively, a tune-away duration for the predicted tune-away may be determined based at least in part on stored information identifying at least one previous tune-away duration.

Additionally, or alternatively, the predicted tune-away may be determined based at least in part on a cell change.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

FIG. 9 is a diagram illustrating an example process 900 performed, for example, by a UE, in accordance with various aspects of the present disclosure. Example process 900 is an example where a UE (e.g., UE 145, 250) performs tune-away management.

As shown in FIG. 9, in some aspects, process 900 may include determining a predicted tune-away for a set of voice frames (block 910). For example, UE 145, 250 may determine the predicted tune-away for the set of voice frames.

As shown in FIG. 9, in some aspects, process 900 may include dropping, in connection with an occurrence of the predicted tune-away, a subset of packets for a time period corresponding to the predicted tune-away (block 920). For example, based at least in part on determining the predicted tune-away, UE 145, 250 may drop, in connection with the occurrence of the predicted tune-away, the subset of packets for the time period corresponding to the predicted tune-away.

Additionally, or alternatively, at least one packet, occurring during the time period corresponding to the predicted tune-away, may be transmitted after the time period corresponding to the predicted tune-away.

Additionally, or alternatively, a quantity of packets to be dropped as the subset of packets may be determined based at least in part on a transmission queue parameter.

Additionally, or alternatively, UE 145, 250 may transmit, using an enhanced voice services (EVS) codec, redundant data for packets occurring during the time period corresponding to the predicted tune-away.

Additionally, or alternatively, the user equipment is operating in a channel aware mode.

Additionally, or alternatively, a channel aware mode may be activated for the time period corresponding to the predicted tune-away and deactivated after the time period corresponding to the predicted tune-away.

Additionally, or alternatively, UE 145, 250 may receive redundant data for packets occurring during the time period corresponding to the predicted tune-away.

Additionally, or alternatively, activation of a channel aware mode may be signaled using in-band signaling or a real-time transport protocol control protocol message.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

The foregoing disclosure provides illustration and description, but is not intended to be exhaustive or to limit the aspects to the precise form disclosed. Modifications and variations are possible in light of the above disclosure or may be acquired from practice of the aspects.

As used herein, the term component is intended to be broadly construed as hardware, firmware, or a combination of hardware and software. As used herein, a processor is implemented in hardware, firmware, or a combination of hardware and software.

Some aspects are described herein in connection with thresholds. As used herein, satisfying a threshold may refer to a value being greater than the threshold, greater than or equal to the threshold, less than the threshold, less than or equal to the threshold, equal to the threshold, not equal to the threshold, and/or the like.

It will be apparent that systems and/or methods, described herein, may be implemented in different forms of hardware, firmware, or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of possible aspects. In fact, many of these features may be combined in ways not specifically recited in the claims and/or disclosed in the specification. Although each dependent claim listed below may directly depend on only one claim, the disclosure of possible aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the term "one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication, comprising:
   determining, by a user equipment, a predicted tune-away for a set of voice frames;
   altering, by the user equipment, a vocoder rate from a first vocoder rate to a second vocoder rate that is less than the first vocoder rate based at least in part on determining the predicted tune-away for the set of voice frames; and
   receiving or transmitting, by the user equipment, redundant data for packets occurring during a time period corresponding to the predicted tune-away.

2. The method of claim 1, wherein the second vocoder rate is determined based at least in part on an uplink bandwidth allocation.

3. The method of claim 1, wherein the second vocoder rate is determined based at least in part on a bandwidth grant.

4. The method of claim 1, wherein the second vocoder rate is determined based at least in part on an overhead characteristic.

5. The method of claim 1, wherein the second vocoder rate is determined based at least in part on the first vocoder rate.

6. The method of claim 1, wherein the predicted tune-away is determined based at least in part on a paging cycle and a tune-away start time.

7. The method of claim 1, wherein a tune-away duration for the predicted tune-away is determined based at least in part on stored information identifying at least one previous tune-away duration.

8. The method of claim 1, wherein the predicted tune-away is determined based at least in part on a cell change.

9. A user equipment, comprising:
   a memory; and
   one or more processors operatively coupled to the memory, the one or more processors configured to:
   determine a predicted tune-away for a set of voice frames; and
   alter a vocoder rate from a first vocoder rate to a second vocoder rate that is less than the first vocoder rate based at least in part on determining the predicted tune-away for the set of voice frames,
   wherein activation of a channel aware mode is signaled using in-band signaling or a real-time transport protocol control protocol message.

10. The user equipment of claim 9, wherein the second vocoder rate is determined based at least in part on an uplink bandwidth allocation.

11. The user equipment of claim 9, wherein the second vocoder rate is determined based at least in part on a bandwidth grant.

12. The user equipment of claim 9, wherein the second vocoder rate is determined based at least in part on an overhead characteristic.

13. The user equipment of claim 9, wherein the second vocoder rate is determined based at least in part on the first vocoder rate.

14. The user equipment of claim 9, wherein the predicted tune-away is determined based at least in part on a paging cycle and a tune-away start time.

15. The user equipment of claim 9, wherein a tune-away duration for the predicted tune-away is determined based at least in part on stored information identifying at least one previous tune-away duration.

16. A method of wireless communication, comprising:
determining, by a user equipment, a predicted tune-away for a set of voice frames; and
dropping, by the user equipment and in connection with an occurrence of the predicted tune-away, a subset of packets for a time period corresponding to the predicted tune-away,
wherein at least one packet, occurring during the time period corresponding to the predicted tune-away, is transmitted after the time period corresponding to the predicted tune-away.

17. The method of claim 16, wherein a quantity of packets to be dropped as the subset of packets is determined based at least in part on a transmission queue parameter.

18. The method of claim 16, further comprising:
transmitting, using an enhanced voice services (EVS) codec, redundant data for packets occurring during the time period corresponding to the predicted tune-away.

19. The method of claim 18, wherein the user equipment is operating in a channel aware mode.

20. The method of claim 18, wherein a channel aware mode is activated for the time period corresponding to the predicted tune-away and deactivated after the time period corresponding to the predicted tune-away.

21. The method of claim 16, further comprising:
receiving redundant data for packets occurring during the time period corresponding to the predicted tune-away.

22. The method of claim 16, wherein activation of a channel aware mode is signaled using in-band signaling or a real-time transport protocol control protocol message.

23. A user equipment, comprising:
a memory; and
one or more processors operatively coupled to the memory, the one or more processors configured to:
determine a predicted tune-away for a set of voice frames; and
drop, in connection with an occurrence of the predicted tune-away, a subset of packets for a time period corresponding to the predicted tune-away,
wherein a quantity of packets to be dropped as the subset of packets is determined based at least in part on a transmission queue parameter.

24. The user equipment of claim 23, wherein at least one packet, occurring during the time period corresponding to the predicted tune-away, is transmitted after the time period corresponding to the predicted tune-away.

25. The user equipment of claim 23, wherein the one or more processors are configured to:
transmit, using an enhanced voice services (EVS) codec, redundant data for packets occurring during the time period corresponding to the predicted tune-away.

26. The user equipment of claim 25, wherein the user equipment is operating in a channel aware mode.

27. The user equipment of claim 25, wherein a channel aware mode is activated for the time period corresponding to the predicted tune-away and deactivated after the time period corresponding to the predicted tune-away.

28. The user equipment of claim 23, wherein the one or more processors are configured to:
receive redundant data for packets occurring during the time period corresponding to the predicted tune-away.

29. The method of claim 1, further comprising:
signaling a channel aware mode based at least in part on determining the predicted tune-away for the set of voice frames.

30. The user equipment of claim 9, wherein the one or more processors are configured to:
signal a channel aware mode based at least in part on determining the predicted tune-away for the set of voice frames.

* * * * *